(12) United States Patent
Van Der Merwe et al.

(10) Patent No.: US 7,904,589 B2
(45) Date of Patent: Mar. 8, 2011

(54) INTELLIGENT COMPUTER NETWORK ROUTING USING LOGICALLY CENTRALIZED, PHYSICALLY DISTRIBUTED SERVERS DISTINCT FROM NETWORK ROUTERS

(75) Inventors: Jacobus Van Der Merwe, New Providence, NJ (US); Dan Pei, Chatham, NJ (US); Thomas B. Scholl, Parlin, NJ (US); Aman Shaikh, Summit, NJ (US); Alex Snoeren, Fullerton, CA (US); Patrick Verkaik, San Diego, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 900 days.

(21) Appl. No.: 11/804,447

(22) Filed: May 19, 2007

(65) Prior Publication Data

US 2008/0285541 A1    Nov. 20, 2008

(51) Int. Cl.
 *G06F 15/16* (2006.01)
(52) U.S. Cl. ......................................... 709/238; 370/351
(58) Field of Classification Search .......... 709/238–244, 709/200–202; 370/254, 351–356, 400–401
See application file for complete search history.

(56) References Cited

U.S. PATENT DOCUMENTS

| | | | |
|---|---|---|---|
| 6,604,146 B1 | 8/2003 | Rempe et al. | |
| 7,457,244 B1 * | 11/2008 | Ye et al. | 370/230 |
| 7,609,672 B2 * | 10/2009 | Retana et al. | 370/328 |
| 7,697,439 B2 * | 4/2010 | Martini et al. | 370/238 |
| 2003/0112792 A1 | 6/2003 | Cranor et al. | |
| 2003/0223406 A1 | 12/2003 | Balay et al. | |
| 2006/0029035 A1 | 2/2006 | Chase et al. | |
| 2006/0256724 A1 * | 11/2006 | Martini et al. | 370/238 |
| 2006/0268681 A1 * | 11/2006 | Raza | 370/216 |
| 2006/0291446 A1 | 12/2006 | Caldwell et al. | |
| 2006/0291473 A1 | 12/2006 | Chase et al. | |
| 2008/0062891 A1 * | 3/2008 | Van der Merwe et al. | 370/254 |

OTHER PUBLICATIONS van der Merwe, Jacobus E., et al. "Dynamic Connectivity Management with an Intelligent Route Service Control Point," *ACM SIGCOMM INM*, Oct. 2006.
Feamster, Nick, et al. "The Case for Separating Routing from Routers," *ACM SIGCOMM FDNA*, Aug 2004.
Caesar, Matthew, et al., "Design and implementation of a Routing Control Platform," *ACM/USENIX NSDI*, 2005.

* cited by examiner

*Primary Examiner* — Moustafa M Meky

(57) ABSTRACT

A route control architecture allows a network operator to flexibly control routing between the traffic ingresses and egresses in a computer network, without modifying existing routers. An intelligent route service control point (IRSCP) replaces distributed BGP decision processes of conventional network routers with a route computation that is flexible and logically centralized but physically distributed. One embodiment supplements the traditional BGP decision process with a ranking decision process that allows route-control applications to explicitly rank traffic egresses on a per-destination, per-router basis. A straightforward set of correctness requirements prevents routing anomalies in implementations that are scalable and fault-tolerant.

15 Claims, 12 Drawing Sheets

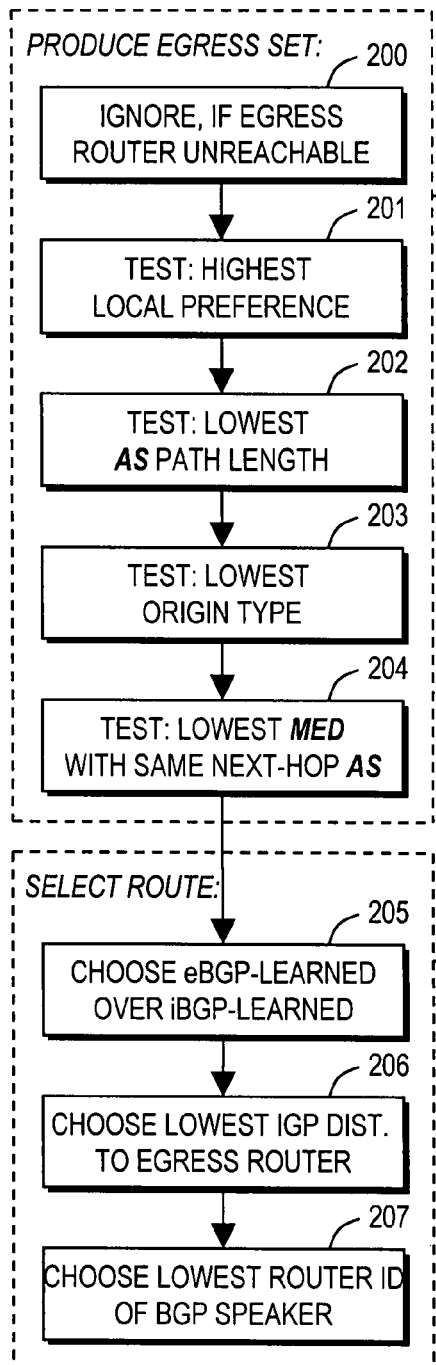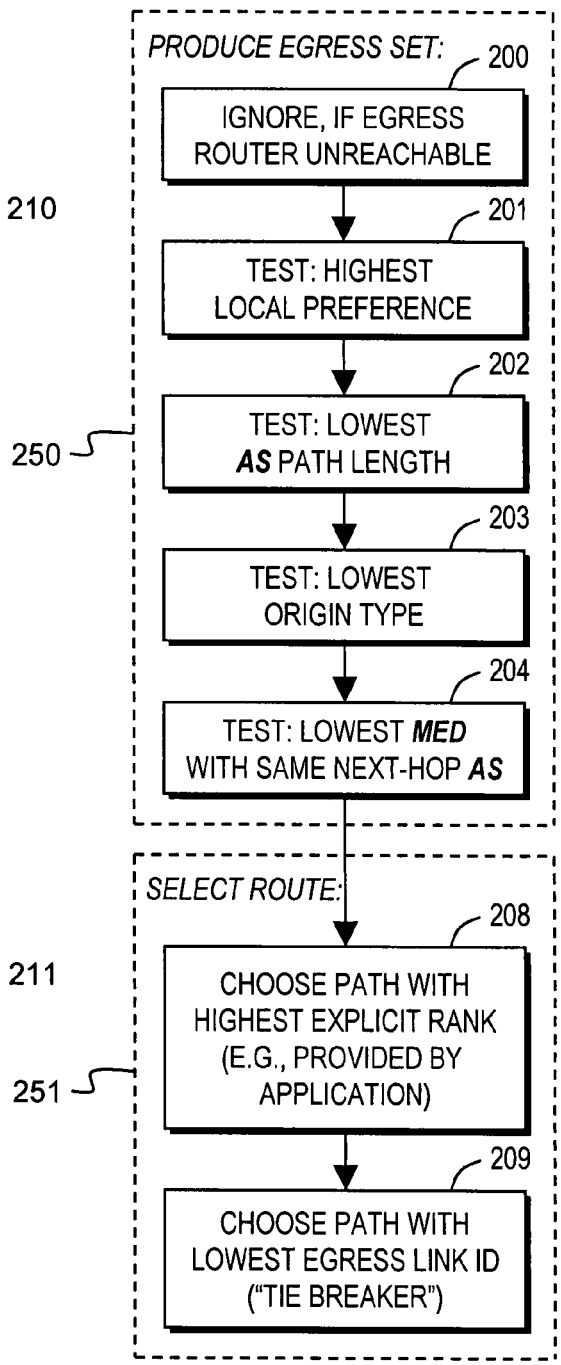
*PRIOR ART*
*FIG. 2A*
*FIG. 2B*

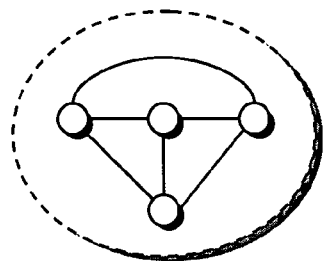
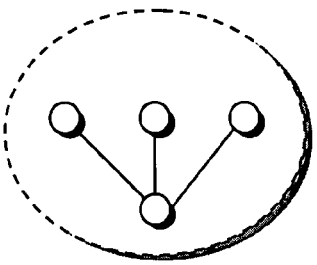
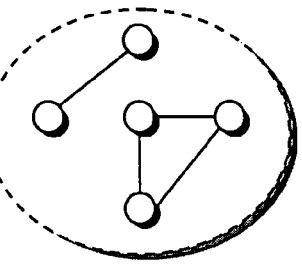
FIG. 7A   FIG. 7B   FIG. 7C

◯ IGP PARTITION   ◯ IRSCP SERVER   — IRSCP SESSION

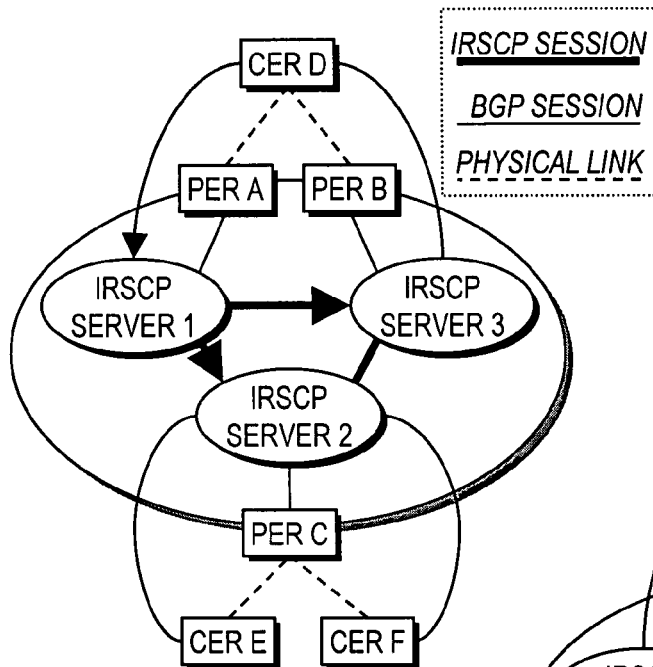
*FIG. 8A*
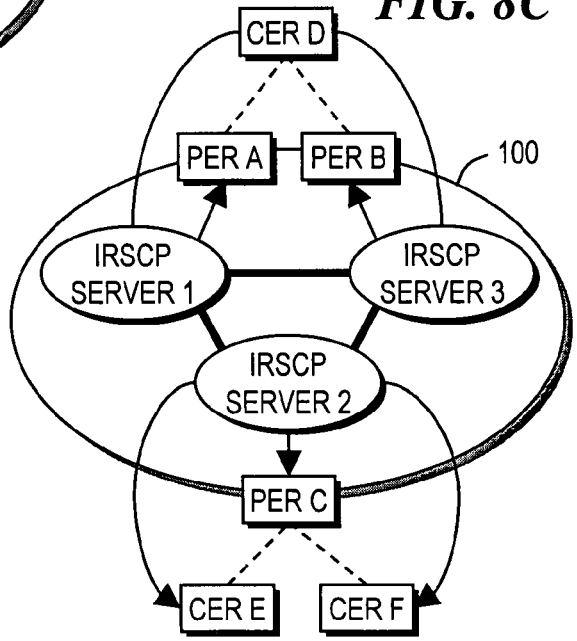
*FIG. 8C*
| ROUTE DISTRIBUTION; IRSCP RIB OF IRSCP 1 | | | |
|---|---|---|---|
| DESTI-NATION | EGRESS LINK ID | SENDER | ATTRI-BUTES |
| 190.2.20.5.55 | D-A | CER D | --- |
| 190.2.20.5.55 | D-B | IRSCP 3 | --- |
| 190.2.20.5.55 | E-C | IRSCP 2 | --- |
| 190.2.20.5.55 | F-C | IRSCP 2 | --- |
*FIG. 8B*

INTELLIGENT COMPUTER NETWORK ROUTING USING LOGICALLY CENTRALIZED, PHYSICALLY DISTRIBUTED SERVERS DISTINCT FROM NETWORK ROUTERS

BACKGROUND

1. Field of the Invention

This invention relates to arrangements for route control for routing communications traffic in computer networks. More specifically, the invention relates to arrangements employing logically centralized but physically distributed servers, distinct from network routers, to provide scalable and fine-grained route control.

2. Background Art

Given the best-effort communication model of the Internet, Internet routing has historically been purely concerned with connectivity, that is, finding a loop-free shortest path between Internet endpoints. Deviations from this default behavior normally involved policy changes at fairly slow time-scales to effect business and network management objectives. Further, within a particular network or autonomous system (AS), routing was realized by a fixed and fairly simple decision process designed to ensure consistent decision making between the routers in the network.

As networked applications and traffic engineering techniques have evolved, however, they have placed increasingly sophisticated demands on the routing infrastructure. For example, applications such as voice over Internet protocol (VoIP) and online gaming can be very sensitive to the characteristics of the chosen data path. Numerous studies have shown non-default Internet paths can often provide improved performance characteristics as compared to routing approaches that are not aware of network conditions.

Additionally, today's operators are often required to restrict the "any-to-any" connectivity model of the Internet to deal with unwanted traffic in the form of distributed denial of service (DDoS) attacks. Responses can take the form of black-holing traffic, redirecting it to scrubbing complexes, or even more sophisticated differentiation of unwanted traffic based on network intelligence.

Finally, in some cases the default border gateway protocol (BGP) decision process is simply at odds with provider and/or customer goals. For example (see Jacobus E. van der Merwe et al. "Dynamic Connectivity Management with an Intelligent Route Service Control Point," *ACM SIGCOMM INM*, October 2006), using interior gateway protocol (IGP) cost as a tie breaker in the decision process can lead to unbalanced egress links for customers that are multi-homed to a provider.

These demands demonstrate a need in the art for route control that is fine-grained, informed by external information, and applied at time-scales much shorter than normal routing configuration changes. Unfortunately, BGP does not provide adequate means for performing fine-grained route control. BGP's tuning parameters are both arcane and indirect. Operators are forced to tweak BGP attributes in cumbersome, vendor-specific router configuration languages at a low level of abstraction, frequently leading to ineffective or, worse, incorrect route selections.

Given this scenario, routing and forwarding in typical Internet service provider (ISP) networks may be described in the following way. We specifically consider the role played by border gateway protocol (BGP), interior gateway protocol (IGP) and multi protocol label switching (MPLS), and describe BGP's default route selection process.

FIG. 1A shows a simplified view of the physical infrastructure of a typical ISP. The routers at the periphery of the ISP 100 network connect to customers 120 and other ISPs 110 (called peers). These routers are termed as Provider Edge (PE) routers (PERs), and the routers that interconnect the PERs are called Provider Core (PC) routers (PCRs). The customer routers connecting to PERs are called Customer Edge (CE) routers (CERs). BGP allows an ISP to learn about destinations reachable through its customers and through its peers.

Typically, every PER runs BGP sessions with its attached CERs, and also with other PERs in the ISP network. The former are known as exterior border gateway protocol (eBGP) sessions, while the latter are termed interior border gateway protocol (iBGP) sessions. The eBGP and iBGP sessions are shown, respectively, as light dashed lines and heavy dashed lines in FIG. 1B.

When a PER learns a route over its eBGP session, it propagates the route to other PERs over the iBGP sessions. This propagation allows every PER to learn how to reach every customer network. When a data packet arrives at a PER for a given customer, an ingress PER uses a BGP routing table to determine an egress PER that is connected to the destination customer, and forwards the packet to this PER. This process is depicted in FIG. 1C. Since the packet leaves ISP network at the PER directly connected to the customer, it is called an egress PER and its link to the CER an egress link.

The path between ingress and egress router is determined by another routing protocol known as an interior gateway protocol (IGP). Open Shortest Path First (OSPF) and Intermediate system to intermediate system (IS-IS), are two widely used IGPs.

IGPs determine a path between every PER pair. Thus, when a packet traverses from ingress PER to egress PER, the set of P routers it goes through is determined by the IGP running in the ISP network 100. In an MPLS network (or indeed any network that utilizes tunneling technologies), when the packet goes through P routers, the P routers are not aware of the ultimate destination of the packet. They only know that the packet is going to the egress PER. This operation is achieved by setting up "tunnels" between every pair of PERs in ISP networks (see FIG. 1B), and by prepending information about tunnel end-point (egress PER) to the packet. This obviates the need of running BGP on the P routers since they are only tunneling packets to the egress PER encoded in the packet.

A PER usually receives more than one egress route for a given destination. Accordingly, the PER must run a route selection algorithm called a BGP decision process to select the best route to use for data forwarding. A BGP decision process is shown in FIG. 2A.

Referring to FIG. 2A, starting with the set of routes available to the PER, each step compares a new route with previously received routes to determine the best route. At each step, if the condition holds, the process is completed and the "winning" route is selected. Steps 201-204 compare routes in terms of the BGP attributes attached to the routes, while steps 200 and 205 consider the IGP information associated with the egress PER of the route.

Steps 205 and 206 perform what is loosely called hot-potato routing. Hot-potato routing involves forwarding traffic to the "nearest" (in terms of IGP distance) egress PER. Step 207 is a tie-breaker that ensures that the PER always ends up with a single best route. The PER uses the best route to forward traffic and also sends this route to other PERs and CERs.

FIGS. 1A-1C show a specific problem introduced by the known process of hot-potato routing as an exemplary illustration of the lack of fine grained route control characteristic of the default BGP decision process in FIG. 2A. Assume for this example that the dual connectivity (CER X and CER Y) of the customer network 120 to the provider network 100 (PER 5 and CER 4) is for redundancy reasons so that the same destinations are reachable via both links. All PERs in provider network 100 therefore have two possible routes to reach the customer network. Assume further that most of the traffic destined to the customer network enter the provider network from the peering ISP network.

Assuming unit IGP costs for each internal provider link, PER 1 and PER 2 both prefer the route via PER 5 connected with the customer network. This preference leads to a complete imbalance in the traffic load on the two egress links, with PER 5's egress link carrying all (or most) of the traffic (FIG. 1C).

Thus, there is a need in the art for a more desirable solution. The present inventors have recognized that the solution may be enabled by fine-grained route control, and that load on the two egress links from PER 4 and PER 5 could be balanced by basing the route selection process for the ingress routers on a load balancing algorithm that takes into account both the "offered" ingress load, as well as the load on the egress links where load balancing is desired.

While it is possible in principle to overcome this specific problem using BGP mechanisms, the required configuration changes would be both complicated and fragile. For example, a system could be devised to provide the appropriate ingress policy rules on all edge routers so that routes from the appropriate egress link gets assigned with a higher localpref value so that (in that router) it is preferred over other routes. However, since localpref is an attribute with network wide scope, localpref would have to be reset before the route is advertised to other routers to prevent interference with their selection process.

Earlier work on route servers (D. Haskin, "A BGP/IDRP Route Server alternative to a full mesh routing," *IETF RFC 1863*, October 1995) proposed changes to the way routes were distributed between routers, but specifically did not envision any route selection to be performed in these servers. Later eBGP-speaking route servers (Ramesh Govindan, Cengiz Alaettinoglu, Kannan Varadhan, and Deborah Estrin, "Route Servers for Inter-Domain Routing," *J. Comp. Net. ISDN Sys.*, 30:1157-1174, 1998.) similarly addressed the full-meshed connectivity problem between eBGP speakers (typically in Internet exchange points). Another approach proposed to the IETF more sophisticated route reflectors (O. Bonaventure, S. Uhlig, and B. Quoitin, "The Case for More Versatile BGP Route Reflectors," draft-bonaventure-bgp-route-reflectors-00.txt, July 2004.); the authors described a number of potential applications but restricted their proposal to changes to the iBGP infrastructure. More recently a complete refactoring of the network architecture in the 4D project also proposed a logically centralized control plane that is separated from the forwarding elements (Albert Greenberg, Gisli Hjalmtysson, David A. Maltz, Andy Myers, Jennifer Rexford, Geoffrey Xie, Hong Yan, Jibin Zhan, and Hui Zhang, "A clean slate 4D approach to network control and management," *SIGCOMM CCR*, 35(5), 2005).

Another IETF proposal on changes to the BGP route selection process is similar to an egress ranking functionality (Cisco Systems, "BGP cost community," *Cisco IOS Documentation*; and Alvaro Retana and Russ White, "Bgp custom decision process," draft-retana-bgp-custom-decision-00.txt, April 2003). The proposal defines a new extended BGP community, the cost community, which can be assigned to routes and then be used to break ties at a certain "points of insertion" in the BGP decision process. Their proposal does not indicate under what conditions the cost community would be safe to use and thus there is a need to show how rankings should be constrained to ensure correctness (for example, no deflections or looping; see FIGS. 4C, 4D).

The inadequacies of hot-potato routing are also addressed in (Renata Teixeira, Timothy G. Griffin, Mauricio G. C. Resende, and Jennifer Rexford, "TIE breaking: Tunable inter-domain egress selection," *In CoNEXT*, 2005.). The authors propose a TIE ranking metric, which allows operators to trade off reacting to network changes (like hot-potato routing does) versus a more static ranking, which might be designed to favor specific applications or services. Further, T. C. Bressoud, R. Rastogi, and M. A. Smith, "Optimal configuration for BGP route selection," *IEEE INFOCOM*, March 2003, considers the optimal assignment of routes to routers to satisfy both traffic engineering and capacity constraints. However, neither of these works fully deal with realization options, and thus the needs in the art mentioned above, remain unfulfilled.

SUMMARY

In a computer network having plural routers and plural logically centralized but physically distributed servers, there are provided methods of routing communications from a source network through the computer network to a destination network. In this scenario, the computer network includes (a) first edge routers (ERs) configured to interface with the source and destination networks and (b) core routers; also in this scenario, the source and destination networks include neighboring ERs configured to interface with the first ERs.

One method involves causing the servers, distinct from the routers, to collectively centrally govern routing of the communications among the first ERs, the core routers, and the neighboring ERs. The centrally governing step includes both (a) causing the servers to use iBGP to govern routing through the first ERs and the core routers; and (b) causing the servers to use eBGP to govern routing through the neighboring ERs. The steps of causing the servers to use both iBGP and eBGP enable the servers to have complete visibility of all routes available in the computer network.

Another method involves causing the servers, distinct from the routers, collectively to centrally govern routing of the communications among the first ERs, the core routers, and the neighboring ERs. The centrally governing step involves (1) collecting information that is external to the routing protocols used by the routers, or information derived indirectly from the routing protocols; and (2) causing the servers to use the information to govern the routing of the communications.

Still another method involves causing the servers, distinct from the routers, to perform route selections that result in a ranking of egresses from first ERs to respective neighboring ERs in the destination network, for each destination and for each first ER interfacing with respective neighboring ERs in the source network; and causing the servers, distinct from the routers, to select for routing the communication traffic to the destination, an egress link having a highest rank as determined in the egress link ranking step.

BRIEF DESCRIPTION OF THE DRAWINGS

A more complete appreciation of the described embodiments is better understood by reference to the following Detailed Description considered in connection with the accompanying drawings, in which:

FIGS. 2A and 2B show, respectively, a conventional method of routing and a routing embodiment according to the present IRSCP;

FIG. 4A is considered correct; in FIG. 4B the decision process for PER 3 has not selected any route for this destination and thus traffic is black-holed; in FIG. 4C the decision process for PER 3 has selected PER 1 as best egress route so as to result in a "deflection"; and the forwarding loop in FIG. 4D is a result of multiple deflections;

FIG. 5A shows a topology based on which the application has computed a set of rankings, and FIG. 5B shows how the distance of various tunnels has increased excessively;

FIGS. 6A-6D explain replication of customer connectivity, in which FIG. 6A shows no replication, FIG. 6B shows replication of PER-IRSCP connectivity, FIG. 6C shows replication of CER-IRSCP eBGP session, and FIG. 6D shows replication of all components that make up customer connectivity;

FIGS. 7A-7F show healing an IRSCP graph within a network partition, in which FIG. 7A shows a complete IRSCP graph, FIG. 7B shows an incomplete IRSCP graph, FIG. 7C shows a partitioned IRSCP graph, FIG. 7D shows addition of missing IRSCP peerings to an incomplete IRSCP graph, FIG. 7E shows a network partitioning, and FIG. 7F shows a partitioned IRSCP graph in which all but one partition has a single IRSCP server; and FIGS. 8A-8C explain an example of IRSCP route propagation.

DETAILED DESCRIPTION

Figure 1A:
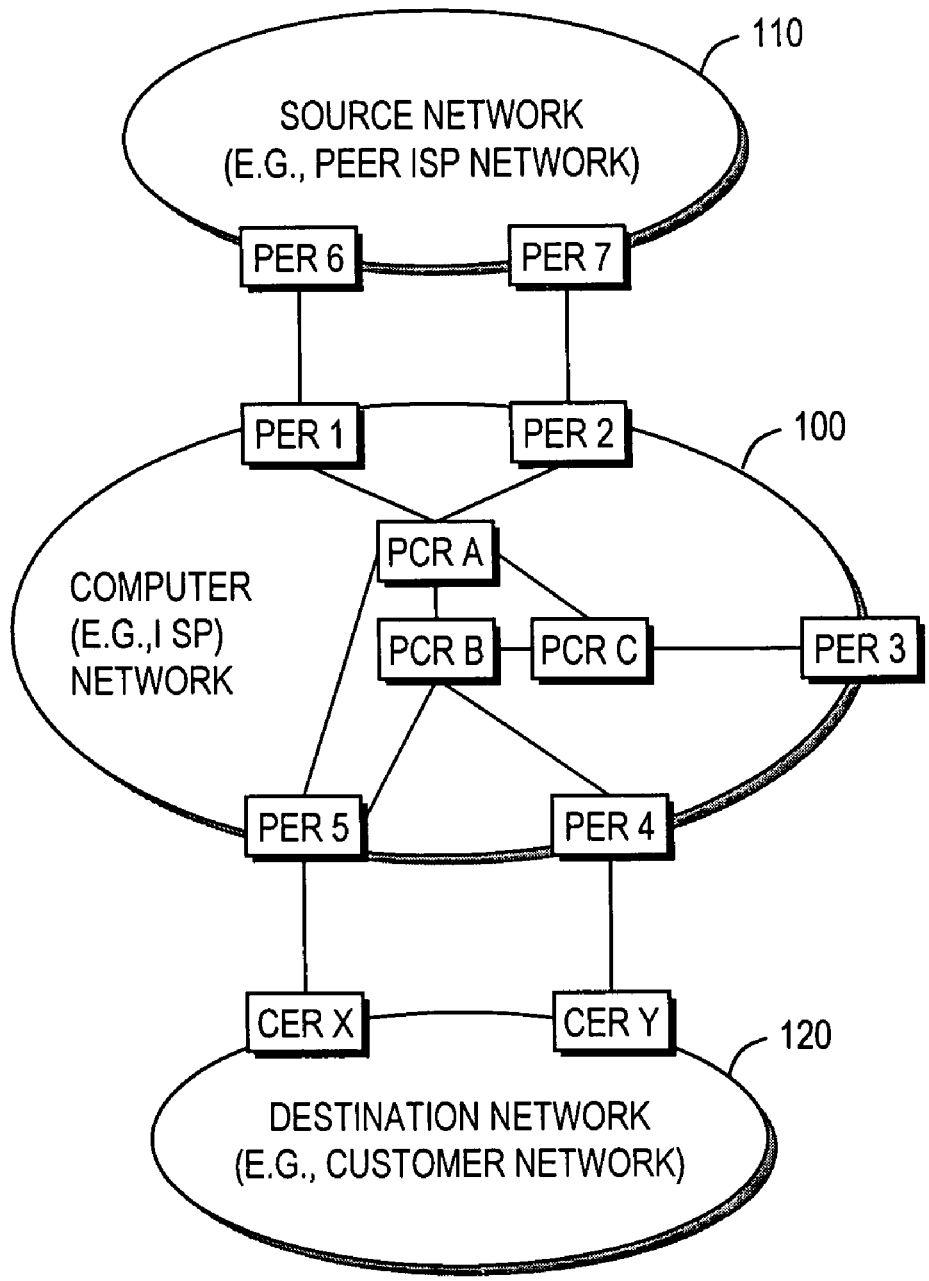
FIGS. 1A through 1C illustrate a typical routing infrastructure for an Internet service provider (ISP), with FIG. 1A emphasizing physical links, FIG. 1B explaining eBGP (light-dashed lines), and iBGP and MPLS (heavy dashed lines), and FIG. 1C emphasizing traffic ingresses (entrances into computer network 100) and egresses (exits from computer network 100 toward customer network 120)
Figure 1B:
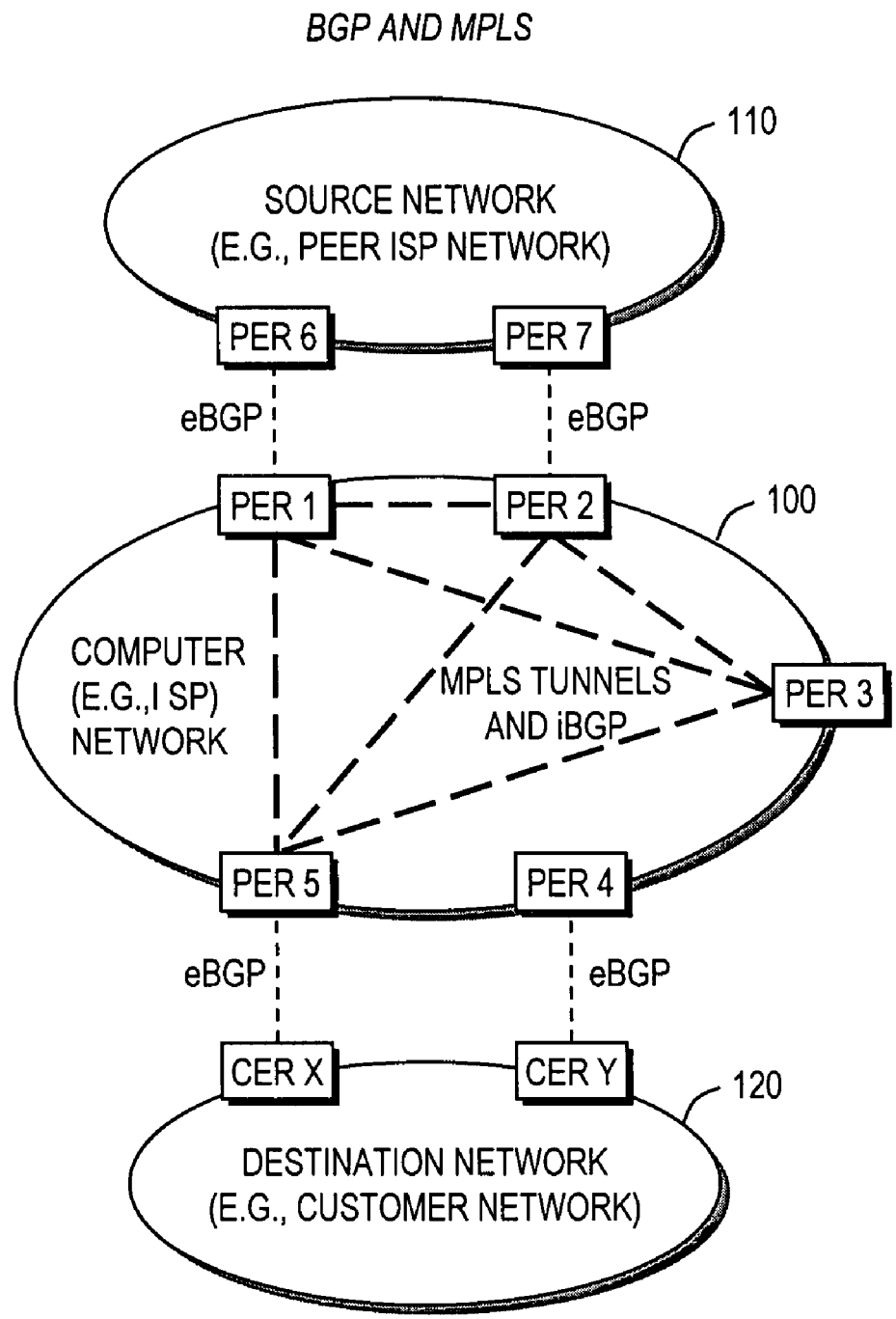
Figure 1C:
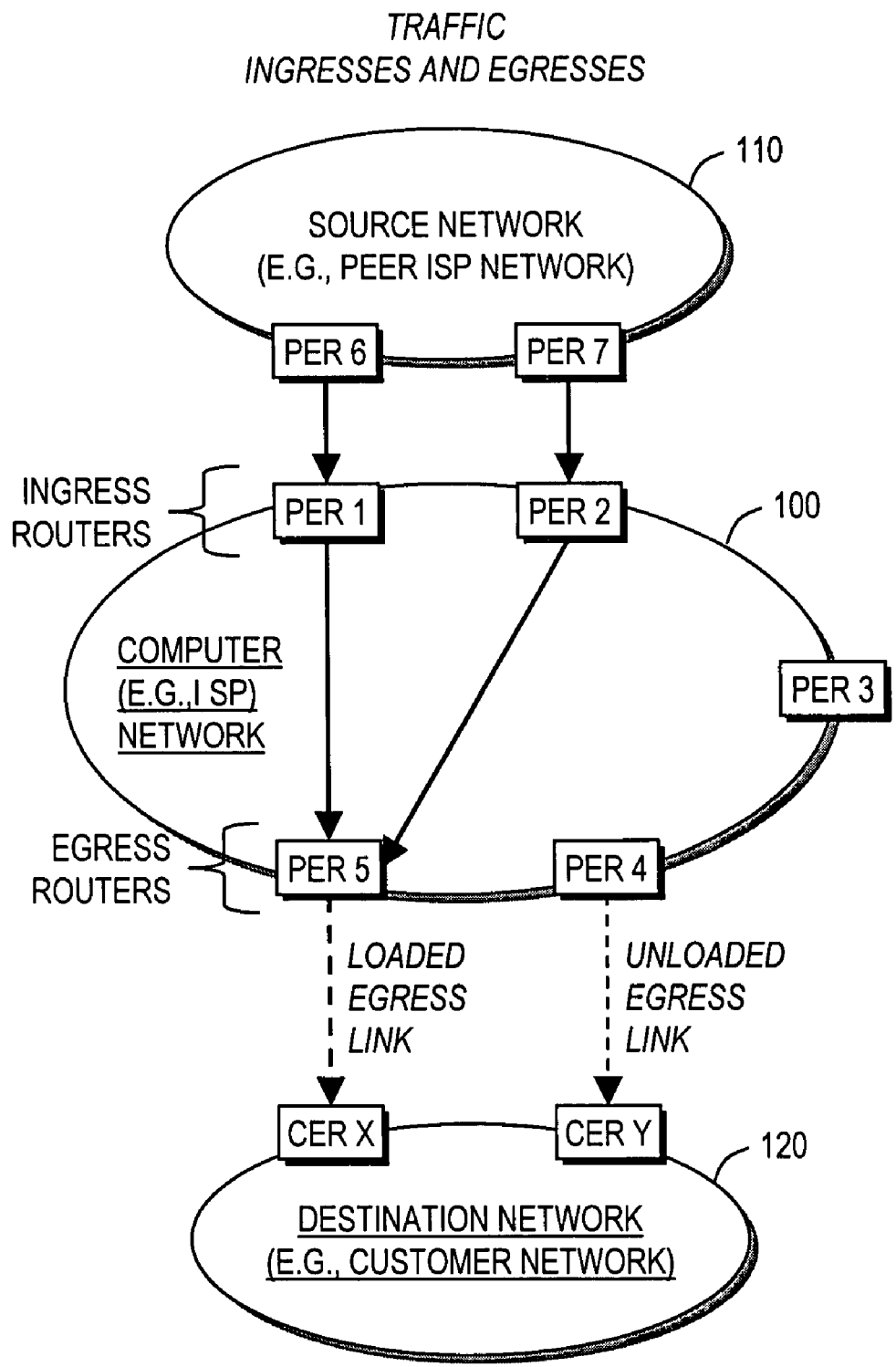

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, details of network communications equipment and techniques that are available or known to those skilled in the art, such as known routers and routing protocols, need not be included. Likewise, in computer-implemented methods, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

As used in this specification, the term server may refer to a software entity and not necessarily to a hardware entity. Thus, saying that a server is distinct from a router does not exclude the possibility that the server may be resident on the same hardware (computer) as the router.

Referring more specifically to the problem discussed in the Background, the present inventors' solutions provide intelligent route control applications (for example, the load balancing application described above) to directly influence the route selection process on a per-destination, per-PER basis. This approach allows applications to supply a ranking of the possible egress links that is taken into account during route selection. This partitioning of functionality allows the route control application to be arbitrarily complex, while the approach itself remains fairly simple. A ranking function effectively replaces conventional hot-potato routing (FIG. 2A steps 205 and 206) in the route selection process. This new approach has the desirable property that a modified decision process still honors other route attributes and their impact on the decision process.

More specifically, various embodiments provide a logically centralized but physically distributed intelligent route service control point (IRSCP), which subsumes the BGP decision process in a platform that is distinct from the routers in a network. The bare concept of a logically centralized route control platform (RCP) that is separate from and backwards compatible with existing routers has been introduced (see Nick Feamster, Hari Balakrishnan, Jennifer Rexford, Aman Shaikh, and Jacobus E. van der Merwe, "The Case for Separating Routing from Routers," *ACM SIGCOMM FDNA*, August 2004).

In Matthew Caesar, Donald Caldwell, Nick Feamster, Jennifer Rexford, Aman Shaikh, and Jacobus van der Merwe, "Design and implementation of a Routing Control Platform," *ACM/USENIX NSDI*, 2005), the feasibility of a centralized iBGP-speaking RCP that performed per-router route selection and thereby implemented a "correct" route-reflector replacement, was demonstrated. Because of the modest scaling requirements in that scenario, each RCP instance dealt with the complete network and the system simply relied on replicated RCP instances to deal with redundancy. Integrating external information into the RCP decision process enables a number of sophisticated connectivity management applications (see "Dynamic Connectivity Management . . ." cited in the Background). In particular, network intelligence can be used to influence the route selection process to arrive at the present intelligent route service control platform (IRSCP).

The present disclosed architecture enables IRSCP to communicate directly with routers in neighboring networks via eBGP, in addition to speaking iBGP with the routers in the IRSCP network. This ability has a number of desirable properties.

First, the IRSCP now has complete visibility of all routes available to the network, as opposed to the previous iBGP-speaking approach in which routers only pass routes they have themselves selected to the IRSCP.

Complete visibility is useful for a variety of reasons. First, complete visibility is an important ingredient for preventing route oscillations within the network. Second, given that the routers in the IRSCP network no longer maintain eBGP sessions with routers in neighboring networks, IRSCP is now effectively the sole controller of BGP route selection. This means that all of the network's routing policy can be handled in the IRSCP servers, as opposed to entrusting policy configuration to the routers themselves.

Providing physically distributed eBGP-speaking IRSCP servers has two consequences. First, because the IRSCP forms BGP peering sessions with all remote routers connected to the IRSCP network, the scalability requirements are significantly higher than that of a earlier approaches: each PER typically peers with tens to hundreds of eBGP speaking routers, including CERs or PERs in neighboring networks. Second, because routers in the IRSCP network now completely rely on the IRSCP for routes, it is desirable to have redundancy in the IRSCP infrastructure.

For these reasons, the present architecture is physically distributed while maintaining the ability to reason about the architecture in a logically centralized manner and ensuring consistent decision making across different replicas (IRSCP servers).

Another consequence of the present arrangement is to enable application-directed route selection. Since IRSCP provides all routes to routers in the network, there is no reason why it should be constrained to the standard BGP decision process. This possibility may be exploited to ease the realization of dynamic connectivity management applications. Specifically, route control applications may impact the route selection process by directly introducing a ranking of egress routes on a per-ingress PER and per-destination basis through a well-defined interface.

The effectiveness of IRSCP's route control interface has been demonstrated by evaluating an example application that uses the IRSCP's interface to load-balance customer traffic (see "Dynamic Connectivity Management . . . " cited above). A challenge to extending the BGP decision process is to ensure that the resulting protocol retains BGP's robustness, scalability, and consistency properties. In the present arrangement, a simple set of constraints on the application-provided route ranking ensures that only safe routing configurations are installed, even in the face of router failures or dramatic changes in IGP topology. Experimentation has demonstrated that the present arrangement is capable of managing the routing load of a large tier-1 Internet service provider.

Fine grained route control. We first describe the IRSCP architecture (FIG. 1D), and then how our ranking decision process (FIG. 2B) combines the directives provided by the route control application with runtime routing information. We formulate a consistency requirement for the ranking decision process that prevents forwarding anomalies (FIGS. 4B-4D), and show that enforcing simple constraints on the application input is sufficient to satisfy the consistency requirement. For completeness, we discuss the role of IGP in the ranking decision process and address issues of scalability and fault-tolerance.

Figure 1D:
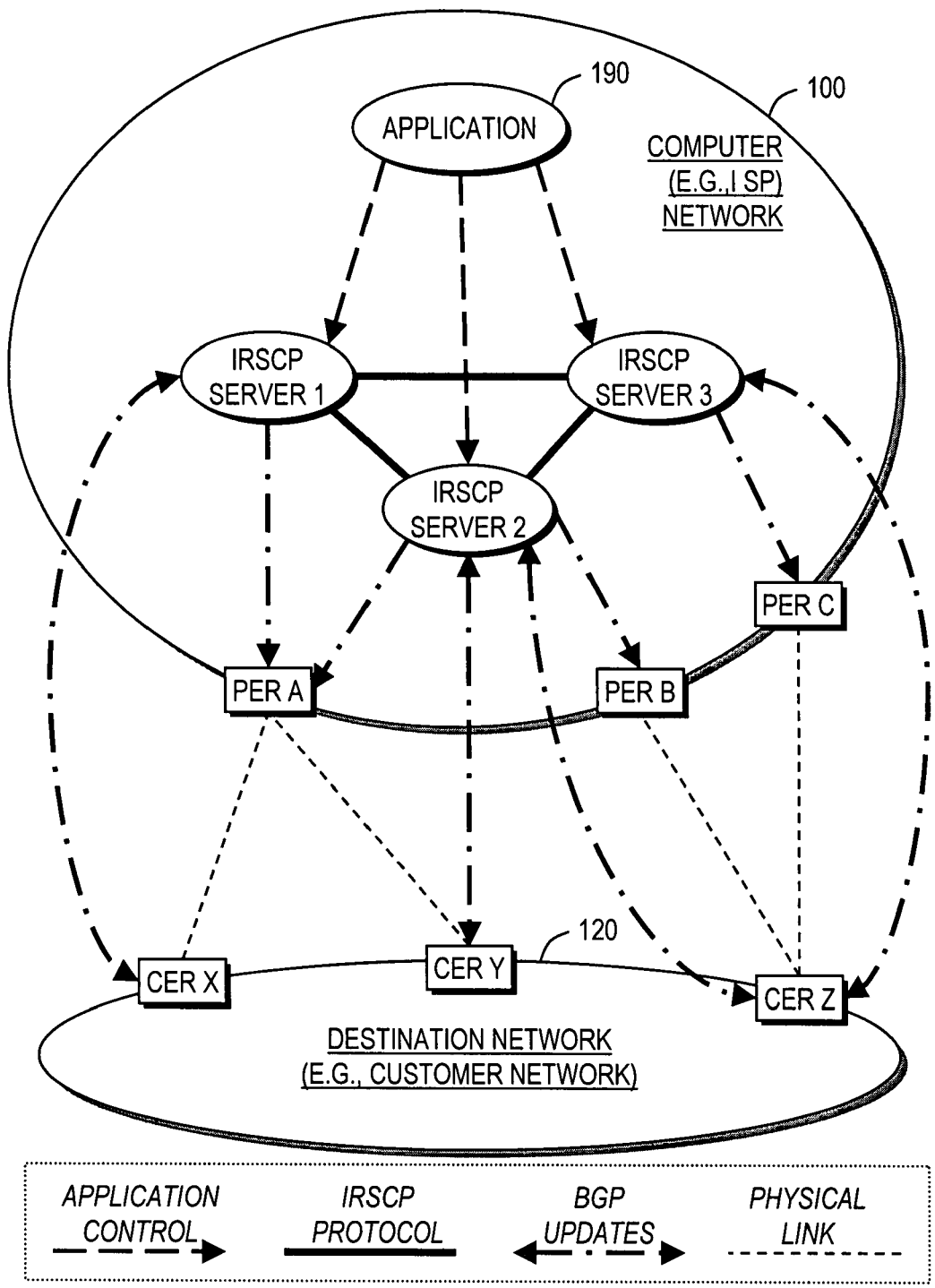
FIG. 1D illustrates a new architecture embodying an intelligent route service control platform (IRSCP) that solves the problems discussed with reference to FIGS. 1A-1C.

IRSCP architecture. One embodiment of an IRSCP architecture is shown in FIG. 1D. The embodiment includes a route control application 190, and a distributed set of servers, including IRSCP SERVER 1, IRSCP SERVER 2, IRSCP SERVER 3, which collectively perform route selection for PER A, PER B, PER C, and CER X CER Y, CER Z. The function of the IRSCP servers is to compute a routing solution in which egress routes received for CERs are assigned to PERs, so that a PER forwards traffic it receives towards the route. IRSCP carries out its function by receiving BGP routes from CERs, executing a decision process to determine what routes each PER should use, and sending the resulting BGP routes to the PERs. In addition, IRSCP updates the CERs attached to a PER with the decision it has made for the PER.

Some embodiments of IRSCP involve a distributed system having multiple IRSCP servers. The motivation for these embodiments lies in requirements of fault-tolerance and scalability. If we designed IRSCP as a single centralized server, failure of that server would leave every PER in the network unable to forward traffic. A distributed IRSCP tolerates the failure of an IRSCP server by letting PERs peer with multiple IRSCP servers. Further, a distributed architecture allows distribution of different IRSCP instances according to redundancy requirements.

A first scalability concern is the number of BGP peering sessions a single IRSCP server maintains. A large Tier-1 ISP has thousands of BGP sessions with routers in neighboring networks, something that no current BGP implementation is able to support. A distributed IRSCP allows partitioning of the BGP sessions among different IRSCP servers.

A second potential scalability issue is the number of BGP routes that a single IRSCP server must store, and the ensuing number of BGP updates it must process, though actual evaluation shows that the number of routes does not pose a problem in a practical embodiment.

The IRSCP defines two types of decision processes: the unmodified BGP decision process and the ranking decision process. Both perform route selection for individual PERs and so are defined on a per-PER basis. The BGP decision process is used for the subset of destinations, unranked prefixes, for which the customer, ISP or route control application has determined that conventional hot potato routing can be used. For the remaining, ranked prefixes from the route control application determines a desirable assignment of egress routes to ingress routers. For example, the assignment may be based on traffic load measurement implemented by the IRSCP (see FIG. 3B, discussed below).

Ranking decision process. In contrast to FIG. 2A which shows a conventional BGP decision process, FIG. 2B shows a method including a ranking decision process.

Steps 200-204, within boxes 200 and 250, produce an egress set. Boxes 200 and 250 may be identical except for which entities (conventional routers versus IRSCP servers) perform the steps. Subsequent steps in boxes 211 and 251 select respective routes from the respective egress sets. The FIG. 2A BGP decision process uses hot-potato routing (steps 205 and 206), whereas the FIG. 2B ranking decision process uses the application-provided explicit ranking (step 208). The processes end with respective "tie-breaker" steps 207, 209.

FIGS. 2A and 2B show route selection processes, given two or more routes to the same destination. Routers (FIG. 2A) or IRSCP servers (FIG. 2B) decide which route to choose. When a given step (test) is satisfied, the decision is made and the selection process is done. To reduce clutter in the drawings, FIGS. 2A, 2B purposely omit 'decision' blocks and 'terminate' blocks; however, it is understood that a route may be chosen and the process terminated, before the entire flowchart is traversed.

In operation, assume a new route is received by the IRSCP, which then needs to decide whether to use it compared to other routes to the same destination that it might have received previously. In FIG. 2B, the IRSCP follows the steps shown:

If the new route received is not reachable via IGP (step 200), then that new route is not further considered and the process is completed.

If the new route is reachable via IGP, the IRSCP compares the new route with the route that it previously thought was best and it looks at the localpref value of the two routes (step 201). If one of the routes has a higher localpref value, the decision is made and the process is completed.

If the local localpref values are the same, then the IRSCP proceeds to the next step 202, and so on.

Significantly, when a new egress set is completed at the output of block 250, route selection is accomplished by step 208, choosing a path with a highest explicit rank that may be provided by an application 190 (FIG. 1D)

Referring back to the architecture embodiment of FIG. 1D, route-control application 190 instructs the IRSCP as to which ingress routers should use which egress routes on the basis of, for example, routing information, traffic load measurements, and other factors. Ideally, application 190 continuously updates the IRSCP so that the IRSCP is able to act in accordance with the current state of the network. In practice, however, the IRSCP is an active participant in BGP and is in a better position to respond instantly to changes in routing state such as BGP route attributes, IGP distances, and the availability of BGP routes. Therefore, in some embodiments the IRSCP combines the input from the application (based on historic routing information) with current routing information.

The application specifies a per-destination, per ingress-router explicit ranking of egress links: that is, egress links ranked by desirability. In the present context, we can use egress links rather than egress routes, since each egress route corresponds to exactly one egress link. The following discussion uses egress link and egress route interchangeably.

Using a ranking rather than a fixed assignment of egress routes to ingress routers accommodates unavailability of egress routes. For example, if the top-ranked egress route is or becomes unavailable, the next-ranked egress route may be selected.

The ranking is specified per destination and per ingress router since in the IRSCP architecture, IRSCP runs a decision process per destination and router.

We refer to an egress link using an egress link identifier, a (CER, PER) pair of the routers on the egress link. Next, we base our decision process for ranked prefixes on the BGP decision process: in some embodiments we simply adopt the first five steps 200-204 of the BGP decision process (FIGS. 2A, 2B) and then apply the explicit ranking 208 (FIG. 2B) instead of performing hot-potato routing 205, 206 (FIG. 2A). The FIG. 2B ranking decision process respects BGP attributes such as AS path length, and takes reachability of egress routers into account. Some embodiments do not include a step based on IGP distance (FIG. 2A step 206) in the BGP decision process.

We illustrate the ranking decision process by considering the scenarios shown in FIG. 3. The IRSCP runs the decision process for every PER in the ISP's network. As an illustrative example, we examine the execution of the decision process for PER A in FIG. 3A.

First, an IRSCP server receives all routes for the given prefix: E-C, F-C and G-D. In this simple example, we identify each route using its egress link identifier and assume that the destination is reachable via each of the three egress links.

Figure 3A:
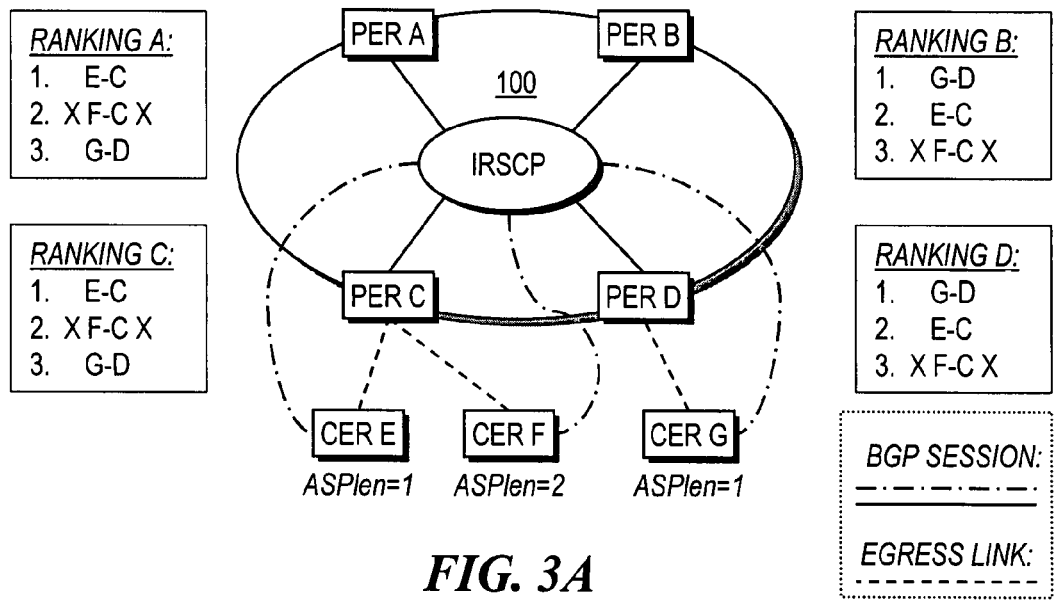
FIGS. 3A-3D explain IRSCP using an example of ranking and its effect on forwarding; the application (not shown) has provided the IRSCP with explicit rankings constituting a list of egress link identifiers, and with CER E, CER F and CER G announcing routes for the same prefix with different AS path lengths (ASPlens) through their eBGP sessions with the IRSCP servers.
Figure 3B:
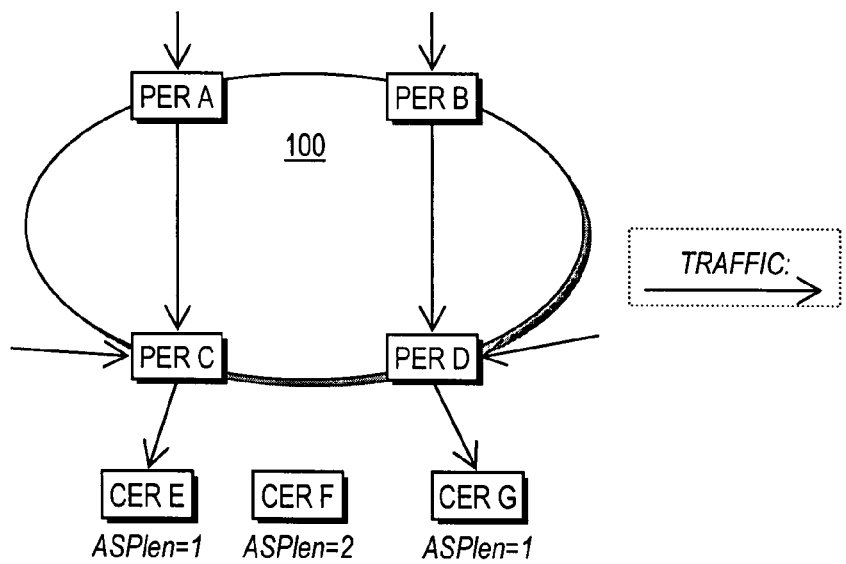

Next, the ranking decision process for PER A executes steps 200-204 of the decision process (FIG. 2B). Step 202 eliminates egress route F-C based on the longer AS path length. FIG. 3A expresses elimination of route F-C by inserting Xs before and after the egress link identifier. In this simple example, we assume the routes have identical local preference, origin type and MED attributes. The result is the egress set {E-C; G-D}.

In step 208 the ranking decision process applies the explicit ranking for PER A to the egress set. Since the top-ranked egress link E-C is present in the egress set, the decision process selects this route for PER A.

In a manner analogous to that discussed above for PER A, the ranking decision process selects route E-C for PER C, and route G-D both for PER B and for PER D. This route selection results in the forwarding behavior shown in FIG. 3B. Steps 200-204 are identical for all PERs, so that the decision process for any PER computes the same egress set.

Between the time that application 190 sends the rankings to the IRSCP and the time that the ranking decision process runs, new egress routes may be announced and old routes may be withdrawn. Until the application updates its rankings, the IRSCP accommodates discrepancies between the available routes assumed when the application creates the rankings and the actual available routes.

Figure 3C:
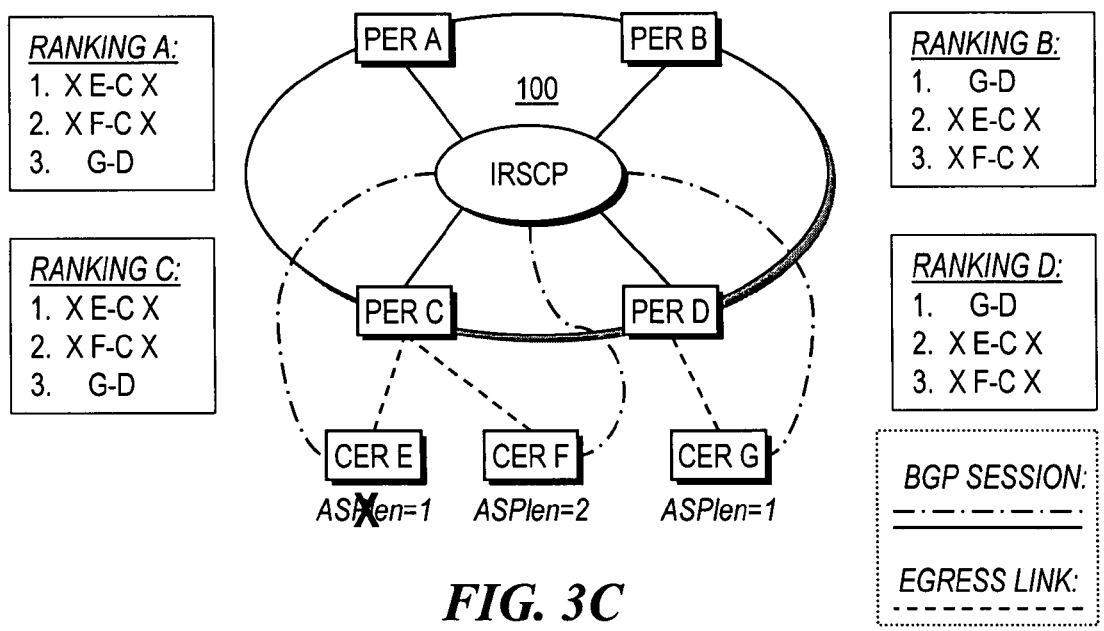
Figure 3D:
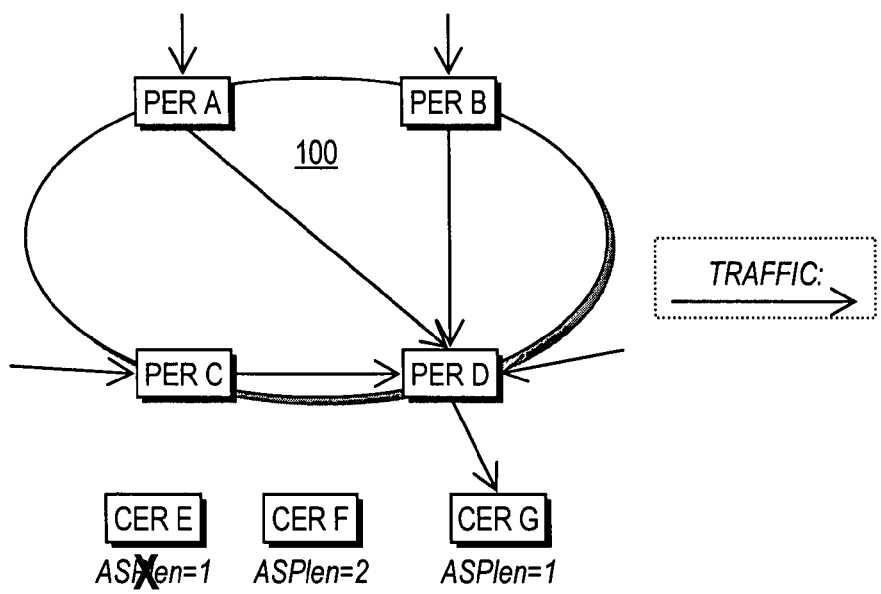

A case in which an egress route is withdrawn is illustrated in FIGS. 3C and 3D. Here it is assumed that CER E withdraws egress route E-C, and the egress set changes to {G-D}. As a result, the decision process changes its selection for PER A and PER C to G-D and all traffic egresses through PER D.

In other words, a ranking specifies not only desired routing for the PER in the absence of failure, but also the desired failover behavior that the PER should adopt. When new egress routes are advertised, IRSCP simply appends them to the end of the explicit ranking in order of egress link identifier, until the application is able to provide a revised ranking that is implemented by steps 208 and 209 of the ranking decision process.

Alternatively, the application may elect not to implicitly append routes in this manner. For example, the application may wish to restrict the set of egress routes of a particular customer to a fixed set, thereby preventing some forms of prefix hijacking. We define a "virtual" black-hole egress route that is part is part of every egress set and (conceptually) sinks traffic directed to it. We also define a corresponding black-hole egress ID that an application can include as part of a PER's ranking. If the ranking decision process for a PER selects the black-hole egress route, the IRSCP server does not send a route to the PER or its attached CERs, thus making the destination unavailable through that PER.

Although the ranking abstraction expresses any consistent assignment of egress routes to ingress routers in the absence of route failures, in some embodiments it is not powerful enough to fail over from one arbitrary assignment to another. For example, a given ranking set that ranks egress link $e_1$ highest for PER A cannot fail over in such a way that egress link $e_2$ is assigned to PER A unless $e_1$ fails. Essentially the ranking abstraction captures the concept of a preferred egress link for a PER and a per-PER fail-over behavior such that traffic does not get deflected.

Figure 4A:
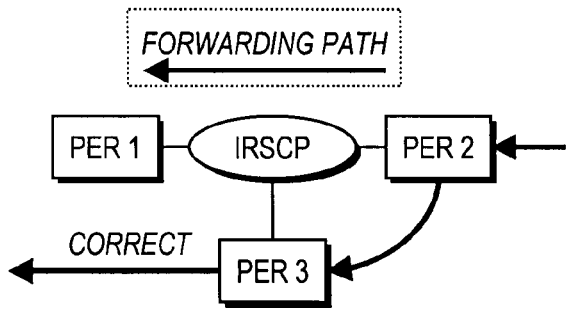
FIGS. 4A-4D explain forwarding anomalies in which the decision process for PER 2 has selected an egress route through PER 3 as best (correct) route for a destination; the decision process for PER 3 has selected a local egress route as best route, and therefore
Figure 4B:
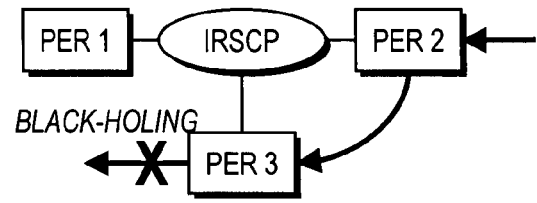
Figure 4C:
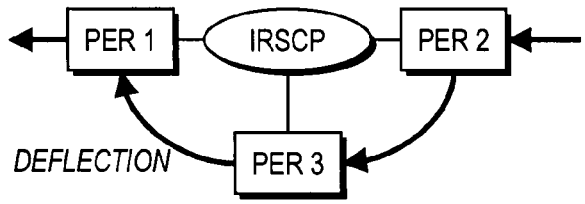
Figure 4D:
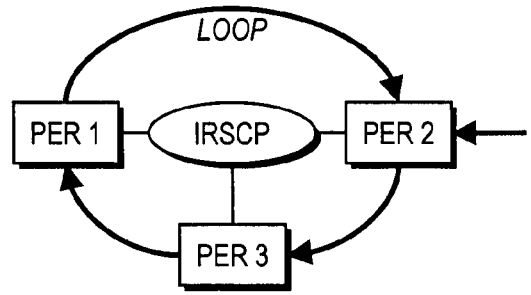

Consistency. The concept of application-provided explicit rankings allows a route control application a great deal of flexibility. However, it also introduces the possibility of the IRSCP executing the decision process in an inconsistent manner for different PERs, which can lead to forwarding anomalies. FIGS. 4B, 4C, 4D depict forwarding anomalies that may result: inadvertent black-holing, deflection, and forwarding loops.

We wish to prevent deflection for two reasons. First, assuming the operator has configured MPLS tunnels for optimal transport between the two endpoints of each tunnel, forwarding through an intermediate BGP router is suboptimal (FIG. 4C). Second, uncontrolled deflection can lead to a forwarding loop (FIG. 4D). Similarly, we wish to avoid black-holing (FIG. 4B) since clearly it is suboptimal to carry traffic through the network only to have it dropped. If the intent is for the traffic to be dropped it should be dropped at in ingress (i.e., at PER 2).

Ultimately, the correctness of the rankings is specific to the application. IRSCP can, however, consider consistency to be a minimum standard of correctness for any route control application and therefore require that a set of constraints be enforced on any set of rankings provided by an application.

Definition: Deflection-free: For each PER r: if egress route e is selected as best egress route for PER r, then some route f is selected as best egress route for PER loc(e) (the "local" PER incident on e) such that loc(f)=loc(e).

Instantiating PER 2 for r and PER 3 for loc(e) it should be obvious that Deflection-freedom prevents the anomalies shown in FIGS. 4B and 4C.

Claim: The BGP decision process in IRSCP is Deflection-Free.

Proof: Suppose for router r egress route e is selected as best egress route. If r=loc(e) we are done, so assume r≠loc(e). Since e is in the egress set of r and all routers share the same egress set, e is also in the egress set of loc(e). (Recall the definition of egress set from FIG. 2B.) Note that for every route f: f is an eBGP route from the perspective of loc(e) iff loc(f)=loc(e). Therefore the BGP decision process for loc(e) has at least one eBGP route when it enters step 208 and eliminates all non-eBGP routes in step 208. Eventually it must select an eBGP route.

It is possible to place a set of constraints on the application-provided explicit rankings that ensure that the ranking decision process is deflection free.

Definition: We define the operator $<_r$ as:
$e_1 <_r e_2$ if and only if in the explicit ranking for router r, egress link $e_1$ is ranked higher than egress link $e_2$.
For example, in FIG. 3A, PER A, we have
E-C$<_A$ F-C and
F-C$<_A$ G-D.
Constraints on explicit ranking are as follows.

Definition: Ranking-Consistent-1: The set of egress routes appearing in each explicit ranking is identical.

Definition: Ranking-Consistent-2: For each router r and all egress links $e_1$; $e_2$:
if $e_1 <_r e_2$ then $e_1 <_{loc(e1)} e_2$.

The rankings shown in FIG. 3A clearly satisfy Ranking-Consistent-1: all rankings contain the same egress links. They also satisfy Ranking-Consistent-2. For example, checking the ranking for PER B we see that
G-D$<_B$ E-C and G-D$<_D$ E-C,
G-D$<_B$ F-C and G-D$<_D$ F-C,
E-C$<_B$ F-C and E-C$<_C$ F-C.

Claim: If the explicit rankings given to a ranking decision process satisfy Ranking-Consistent-1 and Ranking-Consistent-2 then the ranking decision process satisfies Deflection-Free.

Proof: Suppose for router r egress route e is selected as best egress route. We show that e is also selected as best egress route for router loc(e). Since e is in the egress set of r and all routers share the same egress set, e is also in the egress set of loc(e). We also know that e is ranked highest among the routes in the egress set by steps 208 and 209 of the ranking decision process for r, and that by Ranking-Consistent-1 the same egress links appear in r and loc(e)'s explicit rankings.

There are two cases: e does, or does not, appear in the explicit rankings.

If e does not appear in the explicit rankings, none of the routes in the egress set appear in the explicit rankings (or step 208 would have selected a different route for r). Therefore both loc(e) and r identically rank the egress set using step 209, and loc(e) selects e.

If on the other hand e does appear in the explicit rankings, then r has selected it in step 208. Furthermore, with e available we know that loc(e) must select some route $e_2$ that also appears in the explicit rankings (and in the egress set). Suppose $e_2 \neq e$. Then it must be the case that $e <_r e_2$ or step 208 would not have selected e for r. But from Ranking-Consistent-2 it follows that also $e <_{loc(e)} e_2$ and so loc(e) cannot have selected $e_2$.

IGP. We now consider the IGP's role in IRSCP. Route selection for unranked prefixes is governed by the BGP decision process, and so the role IGP plays for unranked prefixes is the same as in BGP. However, an IRSCP server runs a decision process on behalf of a PER but the IRSCP server's position in the IGP topology is different from that of the PER. The IRSCP server is able to take the perspective of the PER on whose behalf it is running the BGP decision process by employing an IGP viewer that provides a global view of the IGP topology (Matthew Caesar, Donald Caldwell, Nick Feamster, Jennifer Rexford, Aman Shaikh, and Jacobus van der Merwe, "Design and implementation of a Routing Control Platform," *ACM/USENIX NSDI*, 2005). Further, in the distributed realization presented here, each IRSCP instance (server) only needs IGP information from the perspective of the set of PERs for which it will be making routing decisions rather than for the network as a whole.

For ranked prefixes, we assume that the application has taken IGP distances into account when it creates the ranking. Although the IRSCP decision process might conceivably re-rank egress links in response to IGP distances, we generally do not let it do so for several reasons. First, for applications such as load-balancing customer traffic, strict adherence to a shortest path policy appears to be of secondary importance. Indeed, tracking IGP distance changes can have adverse effects, such as causing large volumes of traffic to shift inadvertently (Renata Teixeira, Aman Shaikh, Tim Griffin, and Jennifer Rexford, "Dynamics of hot-potato routing in IP networks," *ACM SIGMETRICS*, 2004). The explicit ranking provided by an application introduces a degree of stability, by "pinning" routes. If it is necessary to respond to IGP changes, we may require the application to do so by providing an updated ranking. Results (Renata Teixeira, Timothy G. Griffin, Mauricio G. C. Resende, and Jennifer Rexford, "TIE breaking: Tunable interdomain egress selection," *CoNEXT*, 2005) suggest that in a large ISP with sufficient path diversity in its IGP topology the latency of MPLS tunnels is not greatly affected by IGP changes. For these cases, route pinning does not sacrifice much performance in terms of latency.

However, we do wish to handle the case in which IGP distances "balloon" excessively, effectively making some egress routes unusable. For example, this can occur when physical connectivity is disrupted and IGP diverts traffic around the disruption. Another example is router maintenance: typically the maintenance procedure involves setting the IGP distance between the router and the rest of the network to a very high value in order to gracefully move the traffic away from the router before it is brought down.

Figure 5A:
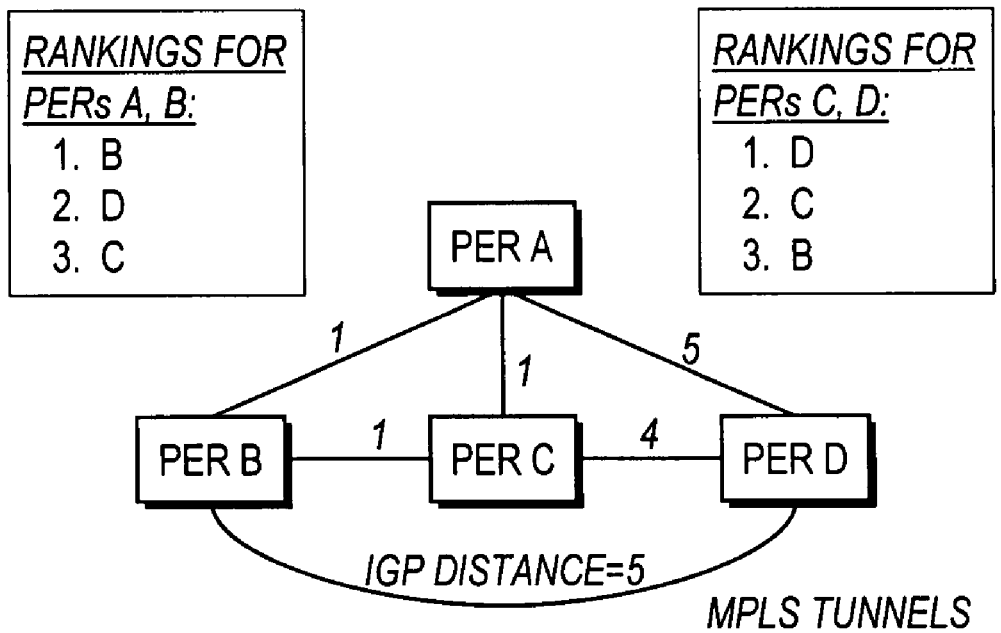
FIGS. 5A and 5B explain IGP ballooning, in which it is assumed all routers are connected by MPLS tunnels having distance metrics computed by IGP.
Figure 5B:
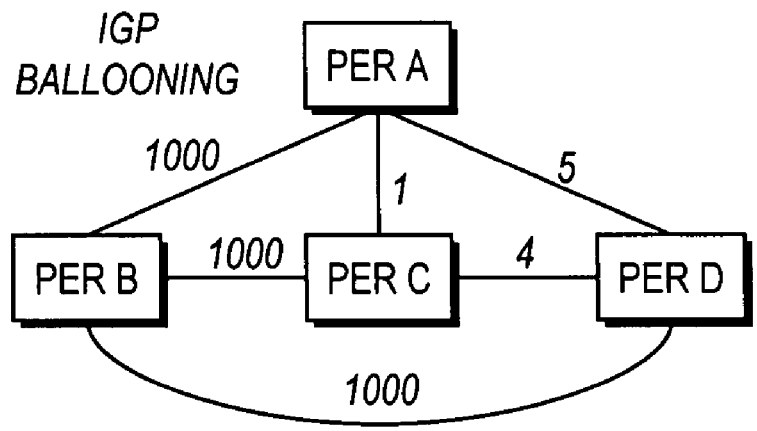

Coming back to the ballooning of the IGP distance, let us look at the example shown in FIG. 5A. The network shown has three egress routes for some given destination: through PER B, PER C and PER D. The application has assigned the egress route through PER B to PER A and PER B and the egress route through PER D to PER C and PER D. In FIG. 5B several IGP distances have ballooned, making PER A's preferred egress route through PER B virtually unusable for PER A, yet A's rankings have not yet been updated.

We define an emergency exit procedure for such cases, as follows. If an IRSCP server finds that the IGP distance to a PE's preferred egress route balloons, the IRSCP server ignores the rankings for that PER and destination and reverts to hot-potato routing (i.e., selects the nearest egress router, possibly itself). In the example, PER A overrides its ranking and chooses PER C. PER C's most preferred egress route (through PER D) has not ballooned and therefore PER C deflects to PER D, at which point the traffic egresses. As this example shows, ignoring the rankings may lead to a deflection. We may consider this acceptable, since in a well-engineered network excessive ballooning should be the exception, and at most one deflection and therefore no forwarding loop can occur, which we prove as follows.

Claim: Adding emergency exit to a deflection-free decision process introduces at most one deflection.

Proof: We consider traffic entering at some ingress PER A and assume that two deflections occur, i.e., traffic is forwarded from PER A to some PERs, PER B; PER C and PER D, in that order. We make two observations. First, PER B, PER C and PER D are egress routers: both a Deflection-Free decision process and Emergency Exit forward only to egress routers. Second, applying Emergency Exit at an egress router causes traffic to egress at that PER. Therefore these deflections can only occur if PER B and PER C do not invoke Emergency Exit, but instead follow their deflection-free decision process.

Now consider a different set of traffic for the same destination, ingressing at PER B. Since a router's forwarding behavior does not depend on where the traffic originates, this traffic follows the path B-C-D. In other words the traffic is deflected without passing through a router that invokes Emergency Exit. This implies that the decision process executed by PER B and PER C is not deflection free.

Consistency in Distributed IRSCP. The previous discussion covers the execution of the decision process on behalf of each PER, and describes how to maintain consistency among executions for a particular destination. However we have made two implicit assumptions:

(a) when the route control application sends a set of explicit rankings to the IRSCP, they are provided to the multiple executions of the decision process simultaneously, and (b) the routing state (i.e., the set of egress routes and the IGP state) that is input to each execution of the decision process is identical.

These assumptions are made only on a per-destination basis, and that assumption (a) is applicable to ranked prefixes, whereas assumption (b) applies to ranked as well as unranked prefixes.

If we construct an IRSCP from a single IRSCP server that runs all decision process executions, these two assumptions are easily met:

(a) the route control application can provide its rankings to the IRSCP server in a single communication, and (b) an IRSCP server has a single view of the routing state.

However, for scalability and robustness reasons the IRSCP is a distributed system with multiple IRSCP servers. Ignoring failure, assumption (a) can be met simply by having the route control application send its rankings to every IRSCP server (FIG. 1D). Under normal circumstances the rankings arrive at the IRSCP servers at approximately the same time. Assumption (b) requires additional care.

To maintain consistency of IGP routing state, each IRSCP server runs an IGP viewer and has the same global view of the IGP topology (Matthew Caesar, Donald Caldwell, Nick Feamster, Jennifer Rexford, Aman Shaikh, and Jacobus van der Merwe, "Design and implementation of a Routing Control Platform," *ACM/USENIX NSDI*, 2005). IRSCP servers exchange external routes with each other using an IRSCP protocol (FIG. 1D). Each pair of IRSCP servers in the network establishes an IRSCP session. When an IRSCP server learns a route from a CER it sends the route to all other IRSCP servers through the IRSCP sessions, as shown in FIG. 8A. Comparing this solution with route reflection in BGP, one difference between route reflection and IRSCP is that a route reflector selects a single route as best route for each destination (using the BGP decision process) and only makes that route available to other route reflectors. As a result different route reflectors may observe a different set of available routes, which in turn has led to non-deterministic or divergent behavior in BGP, e.g., "MED oscillation" (Timothy Griffin and Gordon T. Wilfong, "Analysis of the MED oscillation problem in BGP," *ICNP*, 2002; and D. McPherson, V. Gill, D. Walton, and A. Retana, "Border Gateway Protocol (BGP) Persistent Route Oscillation Condition," *RFC* 3345, 2002.). MED oscillation continues to be observed in the Internet (J. Wu, Z. Mao, J. Rexford, and J. Wang, "Finding a Needle in a Haystack: Pinpointing Significant BGP Routing Changes in an IP Network, "*USENIX NSDI*, 2005.). Also, Anindya Basu, Chih-Hao Luke Ong, April Rasala, F. Bruce Shepherd, and Gordon Wilfong, "Route oscillations in I-BGP with route reflection," *ACM SIGCOMM*, pages 235-247, 2002, show that exchanging all routes selected by steps 200-204 of the decision process is sufficient to prevent non-determinism and divergence in route reflection, at least to the extent that the anomalous behavior is contained within a single network. In IRSCP we exchange a superset.

Fault tolerance. We now discuss how IRSCP handles a number of common failure scenarios including the loss of customer connectivity to IRSCP, failure of individual IRSCP sessions, and IGP failures.

Figure 6A:
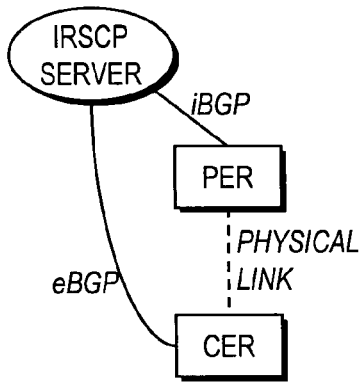

First, we examine failure in customer connectivity to IRSCP, by which we mean the ability for a CER to announce or learn reachability of a route to or from IRSCP. As is apparent from FIG. 6A, CER connectivity can be disrupted by failure of an IRSCP server, a PER, an eBGP session, an iBGP session or a physical link.

Figure 6B:
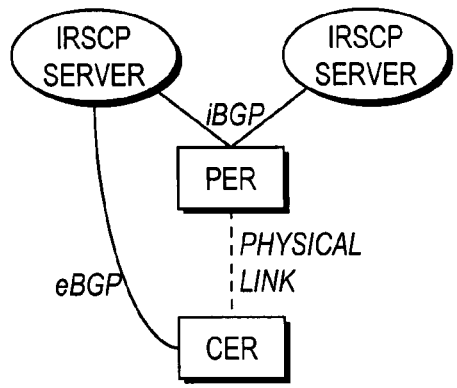
Figure 6C:
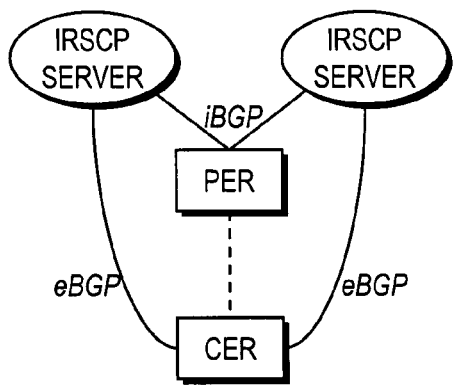
Figure 6D:
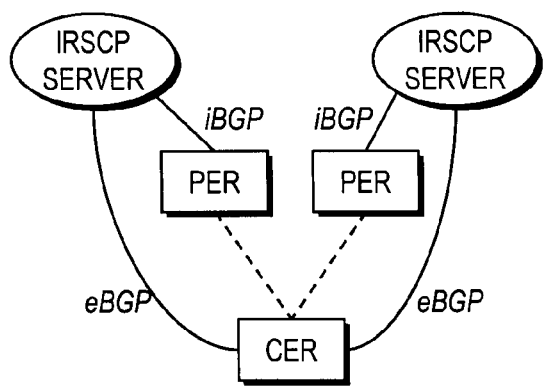

In this context, we consider failure of the CER the customer's responsibility and such failure is not discussed. Robustness to failure of any of the remaining components can be improved by having the customer connect to plural PERs and several IRSCP servers, as shown in FIG. 6D. In addition, individual components can be made more robust as shown in FIGS. 6B and 6C. FIG. 6C introduces two egress routes for a single egress link, implying that step 209 of the ranking decision process does not always decide. In practice, we add a tie-breaker 209 on "IRSCP ID" at the end of the ranking decision process. The IRSCP ID of an egress route identifies the IRSCP server that receives the route on an eBGP session.

Since in some embodiments IRSCP servers do not propagate updates from one IRSCP server to another, each IRSCP server can only learn a particular route from a single IRSCP server. A failure of an IRSCP session can therefore cause IRSCP servers to learn a different set of routes, potentially leading to inconsistency. Our aim is to prevent inconsistency from leading to a situation in which (a) IRSCP servers send updates to a PER that are inconsistent with updates sent to other PERs, (b) several IRSCP servers send inconsistent updates to the same PER. Among many numerous potential causes underlying an IRSCP session failure we focus on misconfiguration of IRSCP peering and network partitioning.

We first discuss the case of a network (IGP) partitioning. By definition, a PER cannot have connectivity to IRSCP servers in different network partitions. Furthermore, there is no reachability between PERs in different network partitions and therefore no inconsistent routing between such PERs. It follows that it is sufficient to ensure consistency among the IRSCP servers within each network partition separately.

Figure 7D:
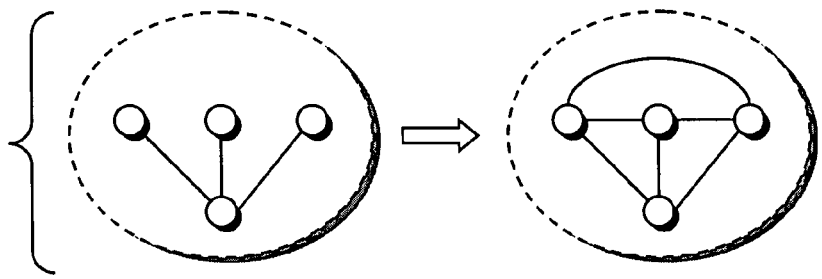

Next we examine inconsistency within a network partition. We define an IRSCP graph consisting of IRSCP servers (vertices) and IRSCP sessions (edges) within a single network partition. In the absence of failure of IRSCP sessions within the network partition the IRSCP graph is complete and has a single connected component (FIG. 7A). Failures of IRSCP sessions within the IGP partition can cause the IRSCP graph to become incomplete (FIG. 7B) or even partition (FIG. 7C). We treat these two cases separately.

To handle failures within one partition in the IRSCP graph, we have IRSCP servers signal to each other (through the IRSCP sessions) which IRSCP servers are in their partition. If an IRSCP server I notices that it does not have an IRSCP peering with some IRSCP server J in its IRSCP partition, it establishes the peering with J (refer to FIG. 7D).

For failures that partition the IRSCP graph, we consider two subcases. The case shown in FIG. 7C in which multiple IRSCP graph partitions contain more than one IRSCP server we assume to be highly unlikely, since it implies that all IRSCP servers in every such partition are misconfigured. In the present context, we do not discuss this case further.

Figure 7E:
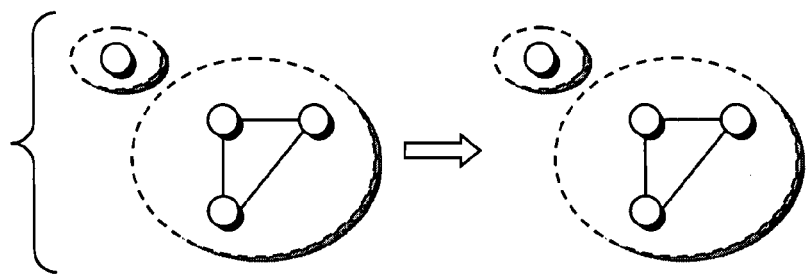

If on the other hand an IRSCP server finds itself alone in an IRSCP graph partition (i.e., it cannot establish any IRSCP sessions), it proceeds by checking its IGP viewer to see if any of the IRSCP servers it is trying to contact are present in its IGP partition. If none of them are, the IRSCP graph partition is in fact a network partition (FIG. 7E), and the IRSCP server continues to function correctly (see above).

Figure 7F:
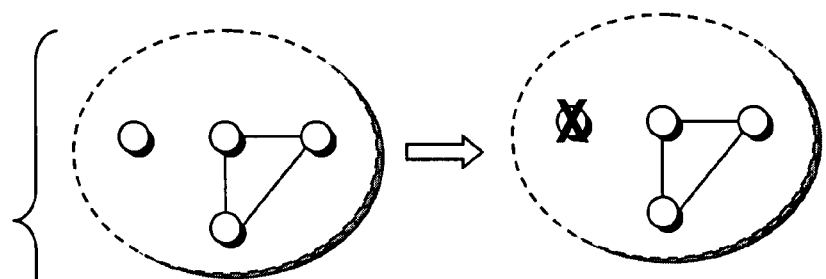

If the IRSCP server does find one of the other IRSCP servers in its network partition it is highly likely that there is a problem with the IRSCP server itself, and the IRSCP server halts (FIG. 7F).

Here we rely on replication of IRSCP servers (discussed earlier) and let another IRSCP server take over. Effectively, this procedure "aligns" each IRSCP graph partition with the corresponding network partition.

Implementations. Having discussed various designs for scalable, fault-tolerant and correct fine-grained route control, we now turn to one set of embodiments of these designs. IRSCP servers interact with BGP routers and run a decision process. As such a significant part of its functionality may be identical to that of a BGP router, some embodiments are therefore based on a BGP protocol stack implementation. In particular, one embodiment uses the code base of the open-source openbgpd router, version 3.9. Below we discuss our modifications to the code base to implement the IRSCP protocol and (routing information base) RIB, and the per-PER decision process (each discussed below). This embodiment relies on the underlying BGP protocol implementation to support common filtering policies (see Matt Caesar and Jennifer Rexford, "BGP policies in ISP networks," *IEEE Network*, November 2005).

IRSCP protocol for route distribution, and RIB (routing information base). We have previously established that to guarantee consistent decision making, IRSCP servers should distribute all available routes to each other. We now describe the IRSCP protocol through which the routes are distributed.

FIG. 8A shows an example in which a route is propagated from a CER to an IRSCP server (through BGP) and from there to other IRSCP servers (through the IRSCP protocol). We discuss subsequent propagation of routes to BGP routers later.

IRSCP servers exchange routes using a simple extension to the BGP protocol. A pair of IRSCP servers maintain a TCP-based IRSCP session over which they exchange incremental updates in the form of advertisements and withdrawals of routes. At session startup the IRSCP servers exchange a series of advertisements corresponding to all known routes, similar to "normal" BGP sessions. When an IRSCP session goes down, all routes exchanged previously on the session are implicitly withdrawn.

When an IRSCP server receives routes from BGP routers and from other IRSCP servers, it stores the routes in a routing information base (RIB), so that the routes are available to the decision process and for further propagation to routers and IRSCP servers. For example, the IRSCP RIB of IRSCP Server 1, shown in FIG. 8B contains four entries for prefix 192.20.5.55. Each entry has fields for the destination prefix, the egress link, the neighbor of the IRSCP server from which the route was received, and BGP attributes that belong to the route. In this example, CER D has sent routes to IRSCP Server 1 and IRSCP Server 3, resulting in the first two entries. The last two entries correspond to routes sent to IRSCP Server 2 by CER E and CER F.

The data structures used to implement the RIB are adapted from openbgpd's implementation of the BGP RIB. Here, openbgpd provides various indexes into the BGP RIB, the most important of which is a Red-Black Tree of destination prefixes, where each entry points to a list of routes (one for each neighbor). We adopted this structure in one embodiment, despite the fact that the number of routes per prefix in IRSCP increases to one route per egress link, thus proportionally increasing the search time for a route in the RIB.

Per-PER Decision Process. Based on the routes stored in the IRSCP RIB for a destination prefix, an IRSCP server is able to run the decision process for each of its neighboring PERs. The first five steps of the BGP or ranking decision process (FIGS. 2A, 2B) are independent of the PER. Therefore a straightforward optimization that our implementation makes is not to execute the entire decision process on a per-PER basis. Rather, an IRSCP server computes the egress set once for a given set of routes (FIG. 2B block 250), and only executes the subsequent steps (block 251) on a per-PER basis.

Application rankings are stored in a per-PER Red-Black Tree of destination prefixes, where each prefix points to the ranked list of egress identifiers for that PER and prefix. Applications currently provide rankings to IRSCP through a file, which can be transferred using any convenient file transfer protocol. When a new ranking file arrives, the IRSCP updates its in-memory ranking tree and reruns the decision process for affected destinations.

Following (re-)execution of the decision process for a given PER, the IRSCP server distributes its decision to the PER and to all CERs attached to the PER (shown in FIG. 8C). The IRSCP server does not need to run a decision process for a CER: as in BGP, the route sent to the CER is the same as is selected for the associated PER.

From the foregoing, it is apparent that the embodiments described above provide a distributed realization of an Intelligent Route Service Control Point (IRSCP) that scales by partitioning work between instances (servers) and allows redundancy requirements to drive the extent to which instances are distributed. The disclosed arrangements also move beyond conventional BGP, allowing route control applications to directly influence the route selection process by providing a ranking of egress links on a per-destination and per-PER basis. The utility of this embodiment includes, for example, load-balancing applications.

Those skilled in the art will readily recognize that the methods disclosed herein may be performed by any suitable general purpose computer or computers, and that as such the details of such computers need not be disclosed herein with particularity since the routers and servers are available to those skilled in the art and the present disclosure enables those skilled in the art to program the servers to operate in accordance herewith.

The computer or a cluster of computers are powered by software to execute the functionality described herein. The functional elements described above may be embodied by any suitable systems for performing the described methods, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The invention envisions at least one computer readable medium. Examples of computer readable media include compact discs, hard disks, floppy disks, tape, magneto optical disks, PROMs (for example, EPROM, EEPROM, Flash EPROM), DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

In a computer network having plural routers and plural logically centralized but physically distributed servers, the present disclosure supports, there are provided methods of routing communications from a source network through the computer network to a destination network. In this scenario, the computer network includes (a) first edge routers (ERs) configured to interface with the source and destination networks and (b) core routers; also in this scenario, the source and destination networks include neighboring ERs configured to interface with the first ERs.

One method involves causing the servers, distinct from the routers, to collectively centrally govern routing of the communications among the first ERs, the core routers, and the neighboring ERs. The centrally governing step includes both (a) causing the servers to use iBGP to govern routing through the first ERs and the core routers; and (b) causing the servers to use eBGP to govern routing through the neighboring ERs. The steps of causing the servers to use both iBGP and eBGP enable the servers to have complete visibility of all routes available in the computer network.

The step of causing the servers to centrally govern routing, may include causing the servers to combine directives from a route control application with runtime routing information received using iBGP and eBGP.

The step of causing the servers to centrally govern routing, may include causing the servers to comply with consistency requirements for a ranking decision process that prevents forwarding anomalies included in a group including blackholing, deflection, and loop formation.

The ranking decision process may include performing route selections that result in a ranking of egresses from first ERs to respective neighboring ERs in the destination network, for each destination and for each first ER interfacing with respective neighboring ERs in the source network.

The computer network may be an Internet service provider (ISP) network in which the first ERs constitute provider edge routers (PERs), the source network may be a peer ISP network in which the neighboring ERs constitute PERs, and the destination network may be a customer network in which the neighboring ERs constitute customer edge routers (CERs).

Another method involves causing the servers, distinct from the routers, collectively to centrally govern routing of the communications among the first ERs, the core routers, and the neighboring ERs. The centrally governing step involves (1) collecting information that is external to the routing protocols used by the routers, or information derived indirectly from the routing protocols; and (2) causing the servers to use the information to govern the routing of the communications.

The information collecting step may include collecting information concerning traffic loading among paths among the first ERs, the core routers, and the neighboring ERs; and the routing governing step may involve load-balancing the communications traffic.

The routing governing step may involve preventing route oscillations.

The routing governing step may involves the servers, and not the ERs or core routers, essentially completely governing route selection.

The step of causing the servers to centrally govern routing, may includes causing the servers to combine directives from a route control application with runtime routing information received using iBGP and eBGP.

The step of causing the servers to centrally govern routing, may include causing the servers to comply with consistency requirements for a ranking decision process that prevents forwarding anomalies included in a group including blackholing, deflection, and loop formation; and the ranking decision process may include performing route selections that result in a ranking of egresses from first ERs to respective neighboring ERs in the destination network, for each destination and for each first ER interfacing with respective neighboring ERs in the source network.

Still another method involves causing the servers, distinct from the routers, to perform route selections that result in a ranking of egresses from first ERs to respective neighboring ERs in the destination network, for each destination and for each first ER interfacing with respective neighboring ERs in the source network; and causing the servers, distinct from the routers, to select for routing the communication traffic to the destination, an egress link having a highest rank as determined in the egress link ranking step.

The egress link ranking step may exclude consideration of IGP distances within the computer network.

The step of causing the servers to perform route selections may include causing the servers to combine directives from a route control application with runtime routing information received using iBGP and eBGP.

The present disclosure further supports computer program products including computer executable code or computer executable instructions that, when executed, causes at least one computer to perform the described methods.

The present disclosure further supports systems configured to perform the described methods.

The present disclosure further supports servers in the described methods.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the spirit and scope of the present invention. It is therefore to be understood that within the scope of the appended claims and their equivalents, the invention may be practiced otherwise than as specifically described herein.

What is claimed is:

1. A method of routing communications from a source network through a computer network to a destination network, comprising:

receiving, at servers that are distinct from routers, requests to generate routing instructions for routing communications among first edge routers and core routers that are in the computer network and neighboring edge routers that are in the source and destination networks;

generating, at the servers, the routing instructions for the first edge routers and the core routers using interior border gateway protocol but not exterior border gateway protocol; and generating, at the servers, the routing instructions for the neighboring edge routers using exterior border gateway protocol but not interior border gateway protocol;

wherein by using both interior border gateway protocol and exterior border gateway protocol, the servers have visibility of all available routes in the computer network.

2. The method of claim 1, wherein the routing instruction generating includes:

combining, at the servers, directives from a route control application with runtime routing information received using interior border gateway protocol and exterior border gateway protocol.

3. The method of claim 1, wherein the routing instruction generating includes:

causing the servers to comply with consistency requirements for a ranking decision process that prevents forwarding anomalies included in a group including blackholing, deflection, and loop formation.

4. The method of claim 3, wherein the ranking decision process includes:

performing route selections that result in a ranking of egresses from first edge routers to respective neighboring edge routers in the destination network, for each destination and for each first edge router interfacing with respective neighboring edge routers in the source network.

5. The method of claim 1, wherein:

the computer network is an Internet service provider network in which the first edge routers constitute provider edge routers;

the source network is a peer Internet service provider network in which the neighboring edge routers constitute provider edge routers; and the destination network is a customer network in which the neighboring edge routers constitute customer edge routers.

6. A system for routing communications from a source network through a computer network to a destination network, comprising:

servers that are distinct from routers and that are configured to receive requests to generate routing instructions for routing communications among first edge routers and core routers that are in the computer network and neighboring edge routers that are in the source and destination networks;

wherein the servers are further configured to generate the routing instructions for the first edge routers and the core routers using interior border gateway protocol but not exterior border gateway protocol;

wherein the servers are further configured to generate the routing instructions for the neighboring edge routers using exterior border gateway protocol but not interior border gateway protocol; and wherein by using both interior border gateway protocol and exterior border gateway protocol, the servers have visibility of all available routes in the computer network.

7. The system of claim 6, wherein the servers are configured to combine directives from a route control application with runtime routing information received using interior border gateway protocol and exterior border gateway protocol.

8. The system of claim 6, wherein the servers are configured to prevent forwarding anomalies included in a group including black-holing, deflection, and loop formation.

9. The system of claim 8, wherein the servers are configured to perform route selections that result in a ranking of egresses from first edge routers to respective neighboring edge routers in the destination network, for each destination and for each first edge router interfacing with respective neighboring edge routers in the source network.

10. The system of claim 6, wherein:
    the computer network is an Internet service provider network in which the first edge routers constitute provider edge routers;
    the source network is a peer Internet service provider network in which the neighboring edge routers constitute provider edge routers; and
    the destination network is a customer network in which the neighboring edge routers constitute customer edge routers.

11. A computer readable storage medium including computer executable code or computer executable instructions that, when executed, causes at least one computer to perform a method of routing communications from a source network through a computer network to a destination network, the method comprising:
    receiving, at servers that are distinct from routers, requests to generate routing instructions for routing communications among first edge routers and core routers that are in the computer network and neighboring edge routers that are in the source and destination networks;
    generating, at the servers, the routing instructions for the first edge routers and the core routers using interior border gateway protocol but not exterior border gateway protocol; and
    generating, at the servers, the routing instructions for the neighboring edge routers using exterior border gateway protocol but not interior border gateway protocol;
    wherein by using both interior border gateway protocol and exterior border gateway protocol, the servers have visibility of all available routes in the computer network.

12. The computer readable storage medium of claim 11, wherein the routing instruction generating includes:
    combining, at the servers, directives from a route control application with runtime routing information received using interior border gateway protocol and exterior border gateway protocol.

13. The computer readable storage medium of claim 11, wherein the routing instruction generating includes:
    causing the servers to comply with consistency requirements for a ranking decision process that prevents forwarding anomalies included in a group including black-holing, deflection, and loop formation.

14. The computer readable storage medium of claim 13, wherein the ranking decision process includes:
    performing route selections that result in a ranking of egresses from first edge routers to respective neighboring edge routers in the destination network, for each destination and for each first edge router interfacing with respective neighboring edge routers in the source network.

15. The computer readable storage medium of claim 11, wherein:
    the computer network is an Internet service provider network in which the first edge routers constitute provider edge routers;
    the source network is a peer Internet service provider network in which the neighboring edge routers constitute provider edge routers; and
    the destination network is a customer network in which the neighboring edge routers constitute customer edge routers.

* * * * *